United States Patent [19]

Horwitz

[11] Patent Number: 4,806,397

[45] Date of Patent: Feb. 21, 1989

[54] FILE FOLDER-TYPE PLACE MAT AND METHOD OF USING SAME

[76] Inventor: Michelle Horwitz, 68-09 Burns St., Forest Hills, N.Y. 11375

[21] Appl. No.: 137,883

[22] Filed: Dec. 24, 1987

[51] Int. Cl.[4] ........................ A47G 1/12; A01N 1/00; B32B 23/02

[52] U.S. Cl. ........................................ 428/14; 428/15; 428/43; 428/192; 428/195; 428/204; 206/553; 206/604; D6/613; D6/614; D6/615

[58] Field of Search ........................ D6/613, 614, 615; 428/14, 15, 43, 204, 192, 195; 206/553, 604

[56] References Cited

U.S. PATENT DOCUMENTS 4,618,992 10/1986 LaGrotteria ........................ 206/604

*Primary Examiner*—Ellis P. Robinson
*Assistant Examiner*—P. J. Ryan
*Attorney, Agent, or Firm*—Frishauf, Holtz, Goodman & Woodward

[57] ABSTRACT

A place mat includes a thin, substantially flat rectangular member having opposite surfaces; one of the surfaces serving as an operative surface, and at least one surface of the member being liquid impervious; a tab having indicia thereon, formed on one edge of the member; and a fold line formed in the member to permit folding of the member thereabout into a configuration of a file folder such that the tab extends beyond respective edges of the member. To use the place mat, the member is folded along the fold line to form the place mat into the configuration of the file folder. The folded place mat is then stored in a file cabinet under the indicia, with the tab and indicia thereon being exposed for view in the file cabinet. The place mat is then removed from the file cabinet for use, unfolded along the fold line to provide a substantially flat place mat, and placed on a surface for receiving foodstuffs on the liquid impervious surface.

18 Claims, 3 Drawing Sheets

FILE FOLDER-TYPE PLACE MAT AND METHOD OF USING SAME

BACKGROUND OF THE INVENTION

This invention relates generally to place mats, and more particularly, is directed to file folder-type place mat, and a method of using the same.

A place mat is a table mat, which is most often rectangular, and on which a place setting is laid. Many types of place mats are known, which vary in size, configuration, materials and the like.

Although place mats are commonly used in restaurants and the home, they are not commonly used in a business office. This is because the place mats are relatively large and cumbersome, and therefore, cannot be conveniently and easily stored.

OBJECTS OF THE INVENTION

Accordingly, it is an object of the present invention to provide a place mat which can be easily and readily stored and retrieved in an office environment.

It is another object of the present invention to provide a place mat which does not occupy an excessive amount of office space.

It is still another object of the present invention to provide a place mat which is convenient to use.

It is yet another object of the present invention to provide a place mat which can be easily and readily stored with conventional files.

It is a further object of the present invention to provide a place mat which is inexpensive to manufacture and use.

It is a still further object of the present invention to provide a method of using and storing a place mat of the above type in an office environment.

The above and other objects, features and advantages of the present invention will become readily apparent from the following detailed description which is to be read in connection with the accompanying drawings.

SUMMARY OF THE INVENTION

In accordance with one aspect of the present invention, a place mat comprises a thin, substantially flat member having opposite surfaces, at least one of the surfaces serving as an operative surface; at least the operative surface of the member being liquid impervious; a tab formed on one edge of the member; and a fold line formed in the member to permit folding of the member thereabout into a configuration of a file folder such that the tab extends beyond respective edges of the member; wherein the folded member can be stored in a file cabinet or the like with the tab visible in the file cabinet or the like for easy retrieval of the place mat.

In accordance with another aspect of the present invention, a method is provided for using a place mat of the type including a thin, substantially flat member having opposite surfaces, at least one of the surfaces serving as an operative surface, at least the operative surface of the member being liquid impervious, a tab having indicia thereon, formed on one edge of the member, and a fold line formed in the member to permit folding of the member thereabout into a configuration of a file folder such that the tab extends beyond respective edges of the member. The method comprises the steps of folding the member along the fold line to form the place mat into the configuration of the file folder; storing the folded place mat in a file cabinet under the indicia, with the tab and indicia thereon being exposed for view in the file cabinet; removing the place mat from the file cabinet for use; unfolding the removed place mat along the fold line to provide a substantially flat place mat; and placing the unfolded place mat on a surface for receiving foodstuffs on the liquid impervious surface.

DETAILED DESCRIPTION

Figure 5:
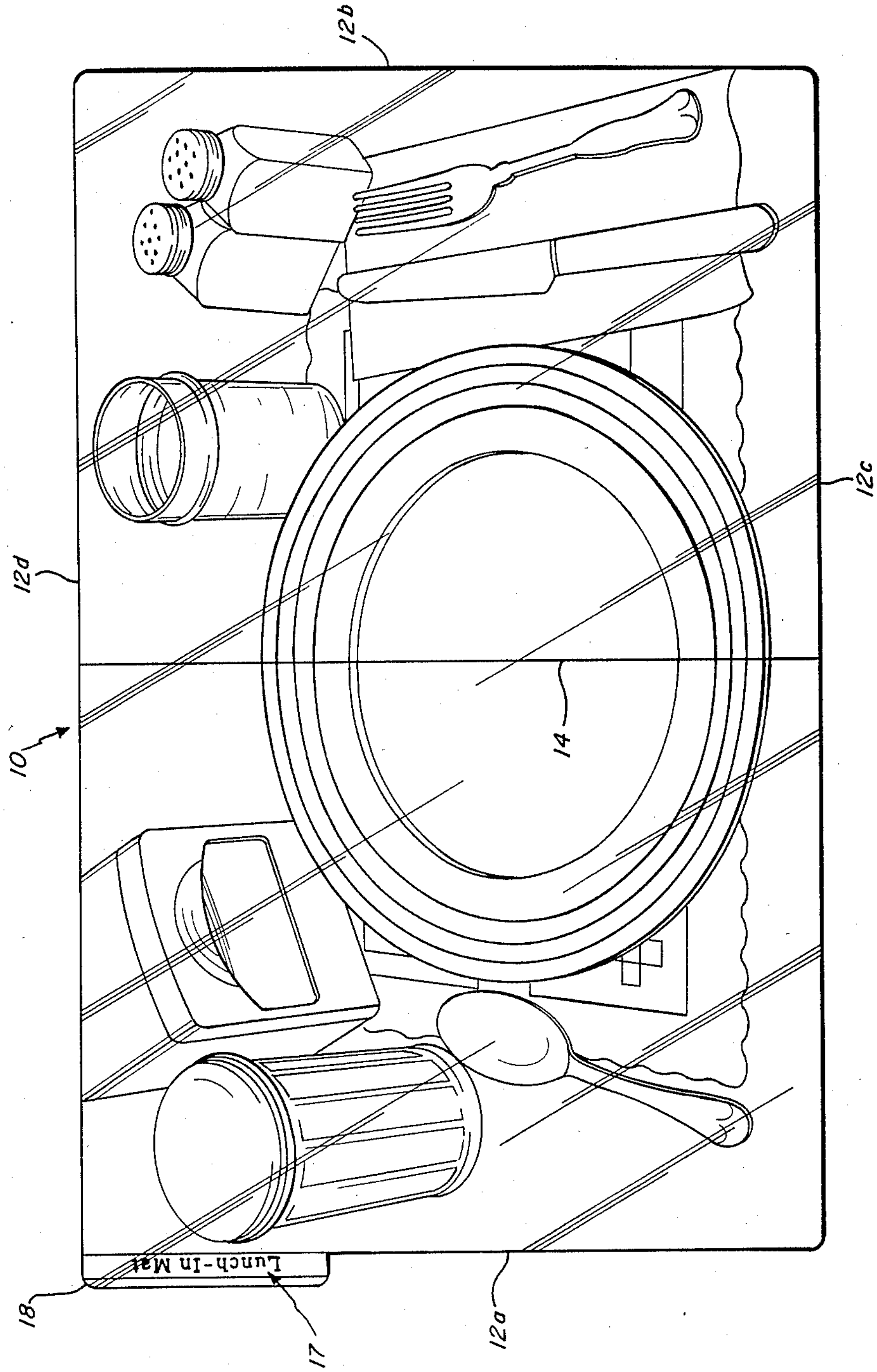
FIG. 5 is a plan view of the place mat of FIG. 1, illustrated in an opened position for use.

Referring to the drawings in detail, a place mat 10 according to one embodiment of the present invention is generally in the form of a file folder. Specifically, place mat 10 is formed from a thin, substantially flat, elongated rectangular member 12, as shown in FIG. 5, having opposite and parallel shorter edges 12*a* and 12*b*, and opposite and parallel longer edges 12*c* and 12*d* which connect shorter edges 12*a* and 12*b*. Rectangular member 12 also includes a substantially center fold line 14 which is parallel to shorter edges 12*a* and 12*b* of rectangular member 12 and which is situated substantially mid-way between shorter edges 12*a* and 12*b*.

Figure 4:
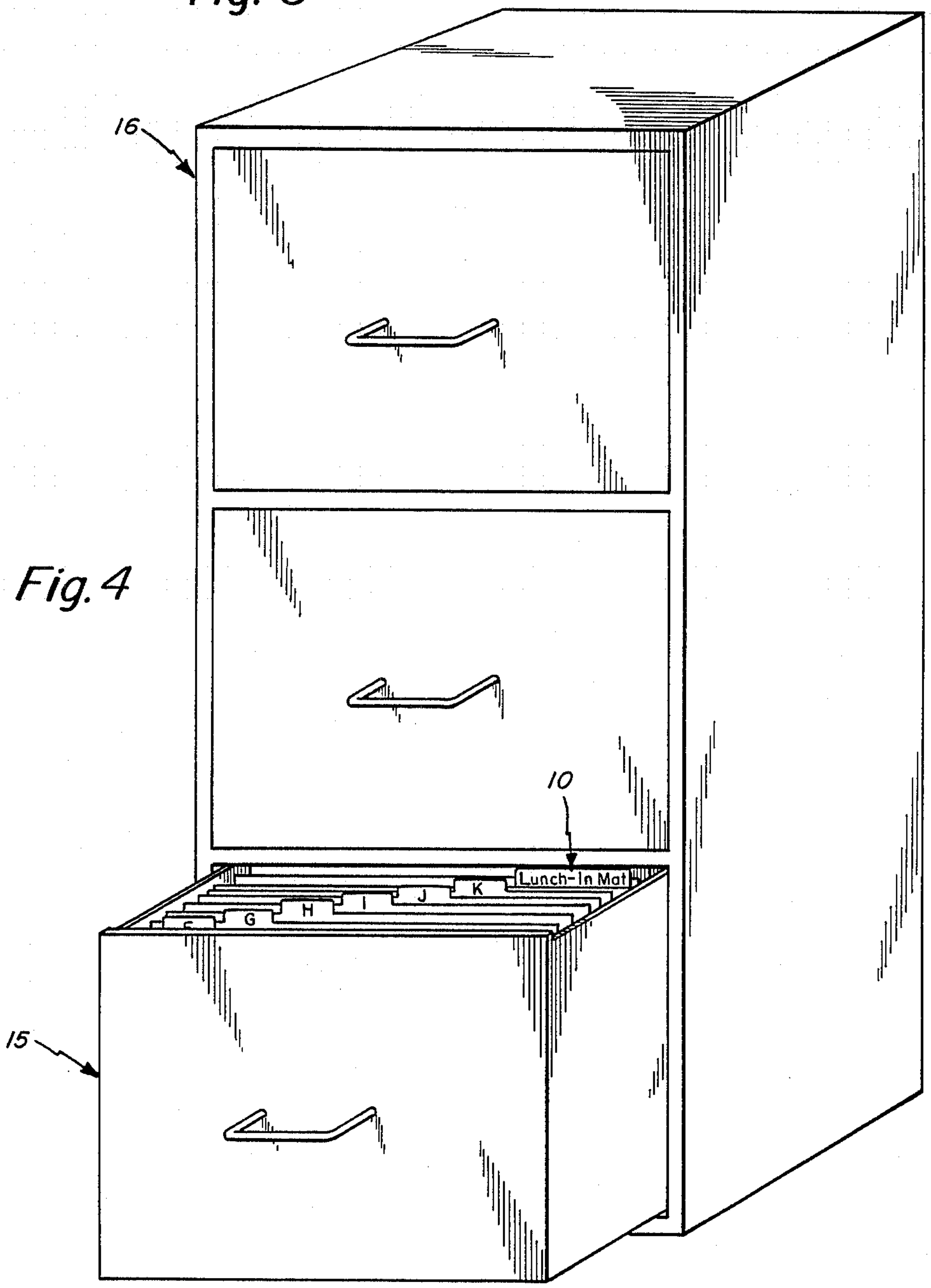
FIG. 4 is a perspective view of the place mat of FIG. 1 stored in a file cabinet.

Thus, when member 12 is folded about fold line 14, place mat 10 assumes a closed file folder configuration. As such, place mat 10 can be stored in a file drawer 15 of a conventional file cabinet 16, as shown in FIG. 4. In order to facilitate storage and retrieval of the folded place mat 10, a shorter edge 12*a* or 12*b* thereof is formed with a tab 18 which extends at a height above shorter edges 12*a* and 12*b* when place mat 10 is stored as a file folder in cabinet 16. Suitable indicia 17, such as an appropriate legend or trademark, such as "LUNCH-IN MAT" can be printed on tab 18. As such, place mat 10 can be stored alphabetically in file drawer 15, so as to provide easy storage and retrieval thereof. However, other indicia, such as numerical designations can be used on tab 18.

Figure 1:
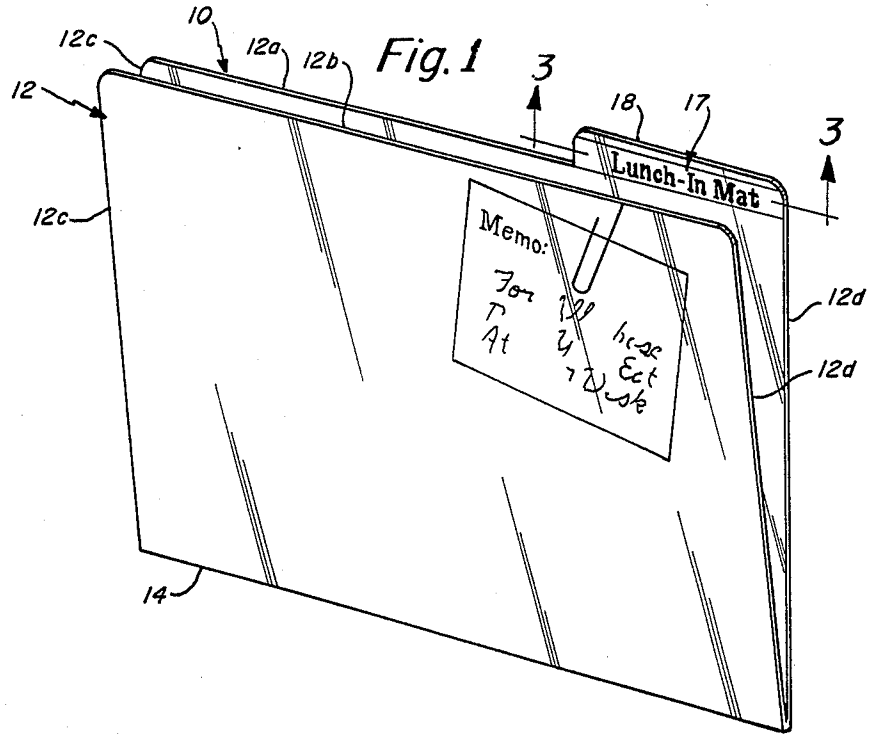
FIG. 1 is a perspective view of a place mat in accordance with one embodiment of the present invention.
Figure 2:
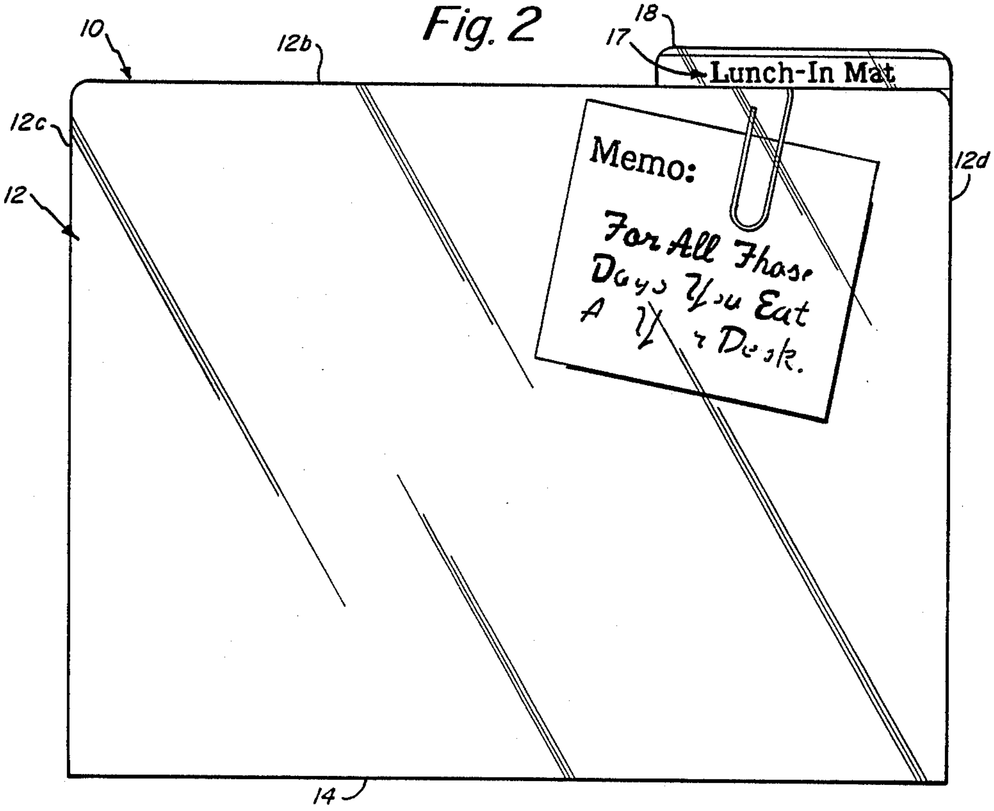
FIG. 2 is a front plan view of the place mat of FIG. 1.
Figure 3:
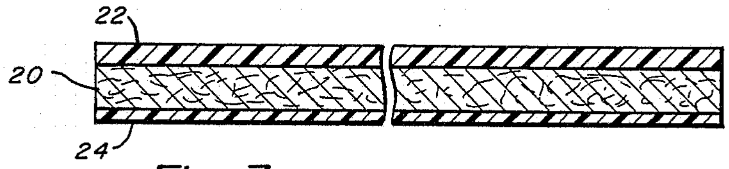
FIG. 3 is an enlarged cross-sectional view of the place mat of FIG. 1, taken along line 3—3 thereof.

Place mat 10 has a liquid impervious surface on at least one side thereof, and preferably, is provided with such liquid impervious surface on both sides thereof. In this regard, as shown in the preferred embodiment of FIG. 3, member 12 is formed from a base 20 of a paper-like, cardboard-like, fiber-like or similar material, with a first protective coating or laminate 22 formed on one surface of base 20 and a second protective coating or laminate 24 formed on the opposite surface of base 20. Protective coatings 22 and 24 may be formed from any suitable liquid impervious material, such as plastic, synthetic resin or the like. In this manner, food and drink items that spill on either surface of place mat 10, can be easily wiped up, without damaging place mat 10. The place mat is preferably relatively stiff but flexible. As an example, base 20 can be made from paper stock 12 ptc1s, and protective coatings 22 and 24 can each be formed from a 3 mil thick plastic laminate. Of course, other values and materials can be used, and the present invention is not limited thereby.

Preferably, the inner surface of place mat 10, when opened up, as shown in FIG. 5, is used for placing food and drink items thereon. In this regard, the inner surface of place mat 10 is preferably formed with a culinary decoration printed thereon, for example, suggesting a table setting (as shown), picnic setting, or the like, which is aesthetically pleasing. The printing is on base 20 and covered by one of the protective coatings 22 or 24.

In use, place mat 10 is retrieved from storage in file drawer 15, and opened up on an office desk, as shown in FIG. 5. Then, food and drink items are placed on place mat 10 for the meal. After the meal has been completed, place mat 10 is wiped clean, folded up and returned to file drawer 15 in its alphabetical order.

It will therefore be appreciated that place mat 10 can be easily and readily stored and retrieved in an office environment, without occupying an excessive amount of office space. Specifically. place mat 10 can be stored with conventional files. Thus, place mat 10 is convenient to use, and is also inexpensive to manufacture and use.

Having described a specific preferred embodiment of the invention with reference to the accompanying drawings, it will be appreciated that the present invention is not limited to that precise embodiment, and that various changes and modifications may be effected therein by one of ordinary skill in the art without departing from the scope or spirit of the invention as defined in the appended claims.

What is claimed is:

1. A place mat comprising:
- a thin, substantially flat member having opposite surfaces, at least one of said surfaces serving as an operative surface;
- at least said operative surface of said member being liquid impervious;
- a tab formed on one edge of said member; and
- a fold line formed in said member to permit folding of said member thereabout into a configuration of a file folder such that said tab extends beyond at least one of respective edges of said member:
- wherein said folded member can be stored in a file cabinet or the like with said tab visible in the file cabinet or the like for easy retrieval of said place mat.

2. A place mat according to claim 1; wherein said member has a substantially rectangular configuration with opposite and parallel shorter edges and opposite and parallel longer edges.

3. A place mat according to claim 2; wherein said tab is connected to one of said shorter edges.

4. A place mat according to claim 3; wherein said tab includes indicia thereon to permit storage of said place mat in the file cabinet under said indicia.

5. A place mat according to claim 4 wherein said indicia includes at least one alphabetic character.

6. A place mat according to claim 2; wherein said fold line is substantially parallel to and mid-way between said shorter edges.

7. A place mat according to claim 1; wherein said member includes:

(a) a base having opposite first and second surfaces, one of said first and second surfaces serving as said operative surface, and (b) a liquid impervious protective coating on at least said operative surface.

8. A place mat according to claim 7; wherein said member includes a liquid impervious protective coating on both of said first and second surfaces.

9. A place mat according to claim 3; wherein said tab extends beyond both of said shorter edges.

10. A method of using a place mat of the type including a thin, substantially flat member having opposite surfaces, at least one of said surfaces serving as an operative surface, at least said operative surface of said member being liquid impervious, a tab having indicia thereon, formed on one edge of said member, and a fold line formed in said member to permit folding of said member thereabout into a configuration a file folder such that said tab extends beyond at least one of respective edges of said member, said method comprising the steps of:
- folding said member along said fold line to form the place mat into the configuration of the file folder;
- storing said folded place mat in a file cabinet under said indicia, with the tab and indicia thereon being exposed for view in the file cabinet;
- removing said place mat from the file cabinet for use;
- unfolding said removed place mat along said fold line to provide a substantially flat place mat; and
- placing said unfolded place mat on a surface for receiving foodstuffs on said liquid impervious surface.

11. A method according to claim 10; further including the steps of cleaning said unfolded place mat after completion of a meal thereon, folding said place mat along said fold line to form the place mat into the configuration of the file folder, and storing said folded place mat in the file cabinet under said indicia, with the tab and indicia thereon being exposed for view in the file cabinet.

12. A method according to claim 10; wherein said member has a substantially rectangular configuration with opposite and parallel shorter edges and opposite and parallel longer edges.

13. A method according to claim 12; wherein said tab is connected to one of said shorter edges.

14. A method according to claim 13 wherein said indicia includes at least one alphabetic character, and said step of storing includes the step of storing said place mat alphabetically in the file cabinet.

15. A method according to claim 12; wherein said fold line is substantially parallel to and mid-way between said shorter edges, and said step of folding includes the step of folding said member substantially in half.

16. A method according to claim 10; wherein said member includes:

(a) a base having opposite first and second surfaces, one of said first and second surfaces serving as said operative surface, and (b) a liquid impervious protective coating on at least said operative surface.

17. A method according to claim 16; wherein said member includes a liquid impervious protective coating on both of said first and second surfaces.

18. A method according to claim 13; wherein said tab extends beyond both of said shorter edges, said operative surfaces has a decoration thereon, and said step of placing includes the step of placing said member on the surface such that said decoration is visible.

* * * * *